(12) United States Patent
Fuhlbrigge et al.

(10) Patent No.: US 11,780,080 B2
(45) Date of Patent: Oct. 10, 2023

(54) ROBOT TEACHING WITH SCANS AND GEOMETRIES

(71) Applicant: SCALABLE ROBOTICS INC., Ellington, CT (US)

(72) Inventors: Thomas Andrew Fuhlbrigge, Ellington, CT (US); Carlos Martinez, South Windsor, CT (US); Gregory Rossano, Enfield, CT (US)

(73) Assignee: SCALABLE ROBOTICS INC., Ellington, CT (US)

( * ) Notice: Subject to any disclaimer, the term of this patent is extended or adjusted under 35 U.S.C. 154(b) by 0 days.

(21) Appl. No.: 17/301,714

(22) Filed: Apr. 12, 2021

(65) Prior Publication Data

US 2023/0150125 A1    May 18, 2023

Related U.S. Application Data

(60) Provisional application No. 62/704,194, filed on Apr. 27, 2020.

(51) Int. Cl.
*B25J 9/00* (2006.01)
*B25J 9/16* (2006.01)

(52) U.S. Cl.
CPC .......... *B25J 9/0081* (2013.01); *B25J 9/163* (2013.01); *B25J 9/1664* (2013.01); *B25J 9/1697* (2013.01)

(58) Field of Classification Search
CPC ........ B25J 9/163; B25J 9/1697; B25J 9/1664; B25J 9/1684; B25J 13/088; B25J 13/089; B25J 19/021; B25J 19/022; B25J 19/023; G06T 1/0014; G06T 2207/20081; G06T 2207/30164; G05B 19/401; G05B 19/4183; G05B 2219/31304; G05B 2219/36288; G05B 2219/36509; G05B 2219/37555; G05B 2219/40622; G05B 2219/39134; G05B 2219/35086; G05B 2219/36175
See application file for complete search history.

(56) References Cited

U.S. PATENT DOCUMENTS

| | | | |
|---|---|---|---|
| 2,019,024 A | 10/1935 | Emerson | |
| 5,662,566 A | 9/1997 | Marxrieser | |
| 6,421,048 B1 | 7/2002 | Shih | |
| 6,542,925 B2 | 4/2003 | Brown | |
| 6,724,364 B2 | 4/2004 | Tani | |
| 7,069,108 B2 | 6/2006 | Saarela | |
| 7,236,854 B2 | 6/2007 | Pretlove | |
| 7,353,082 B2 | 4/2008 | Pretlove | |

(Continued)

FOREIGN PATENT DOCUMENTS

| | | |
|---|---|---|
| CN | 102009323 B | 1/2013 |
| DE | 102016120132 A1 | 4/2018 |
| WO | 2018005053 A1 | 1/2018 |

OTHER PUBLICATIONS

Office Action (Non-Final Rejection) dated Mar. 13, 2023 for U.S. Appl. No. 17/301,670 (pp. 1-6).

(Continued)

*Primary Examiner* — Abby Y Lin
*Assistant Examiner* — Esvinder Singh
(74) *Attorney, Agent, or Firm* — Dilworth IP, LLC

(57) ABSTRACT

A system that uses 3D scanning, a process agnostic pointing device used in conjunction with user input, and geometric analysis of the 3D information to create a robot program.

19 Claims, 15 Drawing Sheets

(56) References Cited

U.S. PATENT DOCUMENTS

| | | |
|---|---|---|
| 7,856,285 B2 | 12/2010 | Carbonera |
| 8,032,605 B2 | 10/2011 | Brown |
| 8,050,782 B2 | 11/2011 | Faellman |
| 8,660,300 B2 | 2/2014 | Svajda |
| 8,751,049 B2 | 6/2014 | Linder |
| 8,918,208 B1 | 12/2014 | Hickman |
| 9,102,055 B1 | 8/2015 | Konolige |
| 9,128,530 B2 | 9/2015 | Yin |
| 9,188,437 B2 | 11/2015 | Kurahashi |
| 9,333,649 B1 | 5/2016 | Bradski |
| 9,423,879 B2 | 8/2016 | Chen |
| 9,669,544 B2 | 6/2017 | Buehler |
| 9,671,777 B1 | 6/2017 | Aichele |
| 9,737,371 B2 | 8/2017 | Romo |
| 9,772,394 B2 | 9/2017 | Nagalla |
| 9,811,074 B1 | 11/2017 | Aichele |
| 9,818,231 B2 | 11/2017 | Coffey |
| 9,895,841 B2 | 2/2018 | Page |
| 9,919,421 B2 | 3/2018 | Rossano |
| 10,078,325 B2 | 9/2018 | Gunnarsson |
| 10,162,329 B2 | 12/2018 | Ndip-Agbor |
| 10,228,428 B2 | 3/2019 | Gustafsson |
| 10,383,654 B2 | 8/2019 | Yilmaz |
| 10,406,686 B2 | 9/2019 | Boca |
| 10,427,300 B2 | 10/2019 | Boca |
| 10,448,692 B2 | 10/2019 | Hsu |
| 10,737,396 B2 | 8/2020 | Rossano |
| 10,864,633 B2 | 12/2020 | Chipalkatty |
| 10,956,739 B2 | 3/2021 | Thomasson |
| 11,059,076 B2 | 7/2021 | Bauer |
| 2001/0028339 A1 | 10/2001 | Tani |
| 2004/0111178 A1 | 6/2004 | Saarela |
| 2005/0149231 A1 | 7/2005 | Pretlove |
| 2005/0256611 A1 | 11/2005 | Pretlove |
| 2008/0065243 A1 | 3/2008 | Fallman |
| 2008/0177410 A1 | 7/2008 | Carbonera |
| 2009/0132088 A1 | 5/2009 | Taitler |
| 2010/0150399 A1 | 6/2010 | Svajda |
| 2010/0185328 A1 | 7/2010 | Kim |
| 2011/0288964 A1 | 11/2011 | Linder |
| 2013/0222580 A1 | 8/2013 | Kurahashi |
| 2013/0249784 A1 | 9/2013 | Gustafson |
| 2015/0002391 A1 | 1/2015 | Chen |
| 2015/0049081 A1 | 2/2015 | Coffey |
| 2015/0177846 A1 | 6/2015 | Yin |
| 2015/0290802 A1 | 10/2015 | Buehler |
| 2015/0309316 A1 | 10/2015 | Osterhout |
| 2015/0314442 A1 | 11/2015 | Boca |
| 2015/0321427 A1 | 11/2015 | Gunnarsson |
| 2015/0324490 A1 | 11/2015 | Page |
| 2016/0016363 A1 | 1/2016 | Smith |
| 2016/0143693 A1 | 5/2016 | Yilmaz |
| 2016/0167232 A1 | 6/2016 | Takeshita |
| 2016/0184032 A1 | 6/2016 | Romo |
| 2016/0257000 A1 | 9/2016 | Guerin |
| 2016/0260261 A1 | 9/2016 | Hsu |
| 2016/0303737 A1 | 10/2016 | Rossano |
| 2016/0375524 A1 | 12/2016 | Hsu |
| 2017/0028557 A1 | 2/2017 | Battisti |
| 2017/0130648 A1 | 5/2017 | Jochman |
| 2017/0143442 A1 | 5/2017 | Tesar |
| 2018/0092698 A1 | 4/2018 | Chopra |
| 2018/0154518 A1 | 6/2018 | Rossano |
| 2018/0173200 A1 | 6/2018 | Atherton |
| 2018/0311818 A1 | 11/2018 | Chipalkatty |
| 2018/0345495 A1 | 12/2018 | Aldridge |
| 2018/0350056 A1* | 12/2018 | Cardenas Bernal . G01N 21/954 |
| 2019/0184582 A1* | 6/2019 | Namiki ................. H04N 23/54 |
| 2019/0275744 A1 | 9/2019 | Tsoutsos |
| 2019/0291277 A1 | 9/2019 | Oleynik |
| 2020/0167886 A1* | 5/2020 | Cho ........................ B25J 9/1697 |
| 2020/0250490 A1* | 8/2020 | Ozawa ................. G06V 40/174 |
| 2020/0368904 A1* | 11/2020 | Aldridge ................ B25J 9/0081 |
| 2021/0129339 A1* | 5/2021 | Pipe-Mazo ............ B25J 13/088 |
| 2021/0138646 A1* | 5/2021 | Matsushima .......... B25J 9/1664 |
| 2021/0220991 A1 | 7/2021 | Rajkumar |
| 2021/0316449 A1* | 10/2021 | Wang ..................... B25J 9/1664 |
| 2022/0152833 A1 | 5/2022 | Lee |
| 2023/0043994 A1* | 2/2023 | Takahashi .............. B25J 9/1697 |

OTHER PUBLICATIONS

International Search Report and Written Opinion issued in App. No. PCT/US22/42715, dated Feb. 27, 2023, 33 pages.

Hsien-Chung Lin, "Embedding intelligence into Robotic Systems-Programming, Learning, and Planning", University of California, Berkeley, Graduate Division, Engineering—Mechanical Engineering, Doctoral Thesis, (online), Nov. 3, 2018 [retrieved on Dec. 16, 2022] retrieved from the Internet <https://escholarship.org/content/qt5z62k45g/qt5z62k45g.pdf> 91 pages.

Office Action dated Mar. 30, 2023 for U.S. Appl. No. 17/301,716 (pp. 1-16).

* cited by examiner

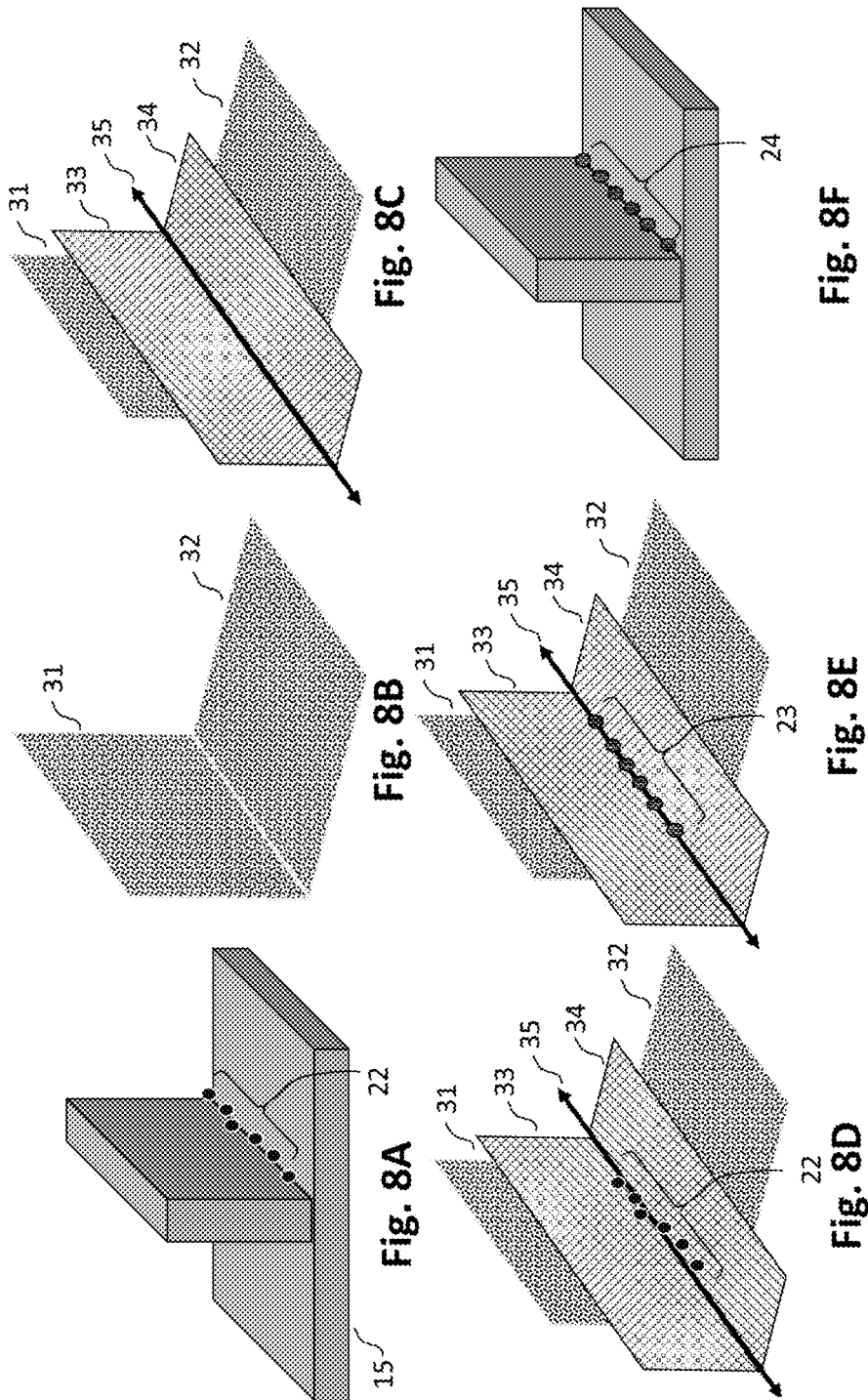

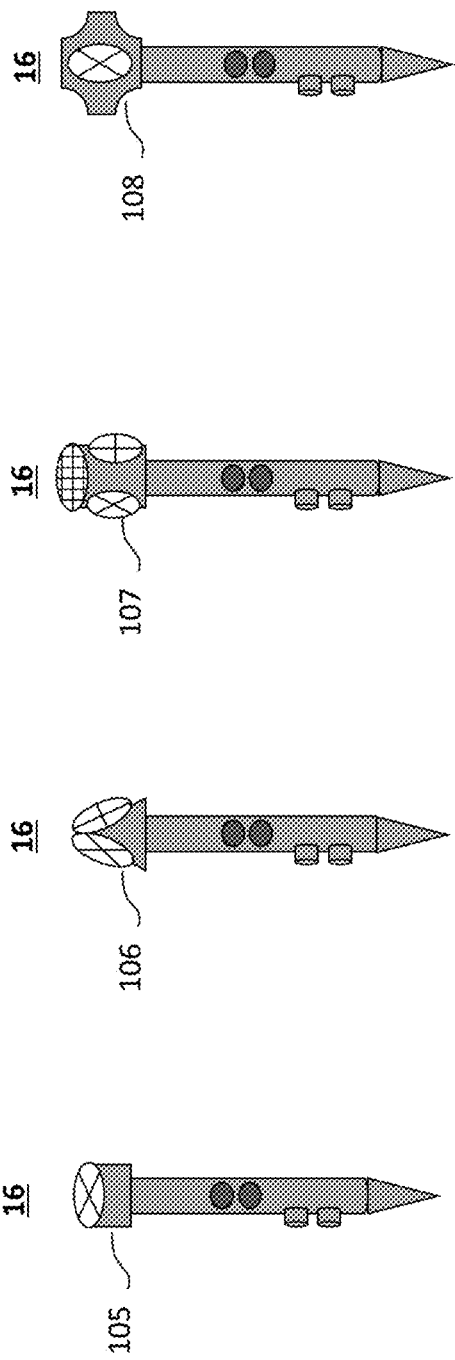

ROBOT TEACHING WITH SCANS AND GEOMETRIES

FIELD OF THE INVENTION

The present invention relates to a novel means of teaching a robot program. More particularly, this invention discloses a means to create a wide variety of robot programs through intuitive human input combined with a 3D scan of representative work pieces.

BACKGROUND

The programming of industrial robotics is a widely known challenge. This is because robot programming requires a rare combination of skills: knowledge of the industrial process (e.g. welding, material removal, painting), knowledge of programming (e.g. variables, control flow), and knowledge of robotics (e.g. speeds, joint limits, singularities). What is required is an intuitive method that provides ease of use, highly accurate robot motion commands, and a consistent user experience.

BRIEF SUMMARY OF THE INVENTION

The present invention comprises a robot programming means that uses 3D scanning and a process agnostic pointing device that is used in conjunction with user input to create a robot program. Other embodiments include the devices, methods, hardware and software components, and combinations thereof to create and execute a robot program. Further embodiments, aspects, and details are provided in the figures and detailed description of the invention.

BRIEF DESCRIPTION OF THE DRAWINGS

FIGS. 8A-8F show a sequence of steps to create poses for the robot motions generated by the robot teaching system;

FIGS. 15A-15D show alternative embodiments of a process agnostic pointing device with modular and exchangeable trackable elements.

DETAILED DESCRIPTION OF THE INVENTION

The descriptions and figures used herein are for the purposes of disclosing particular embodiments of the invention only and is not intended to be limiting of the invention. As used herein, the term "and/or" includes any and all combinations of one or more of the associated listed items.

Figure 1:
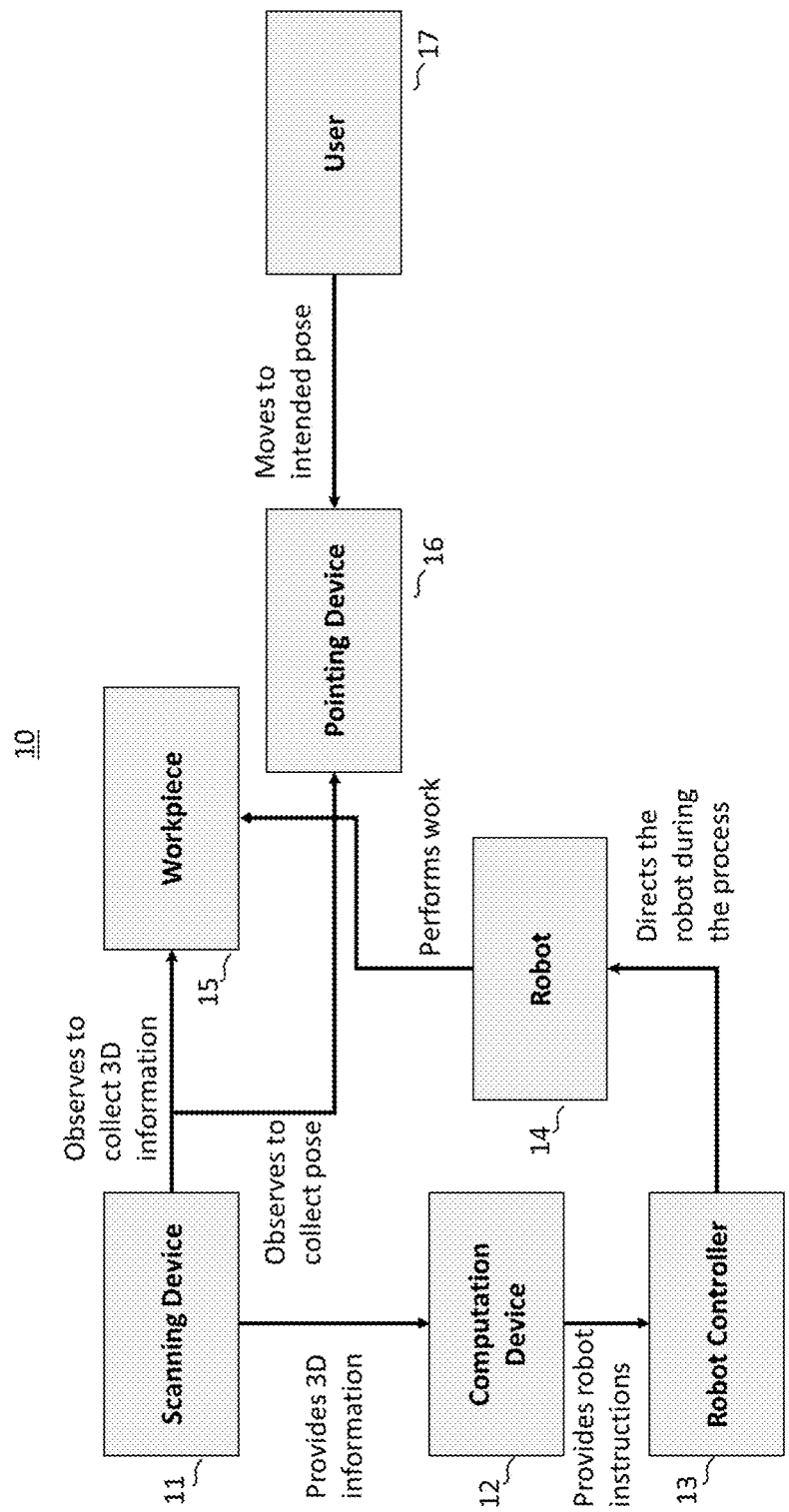
FIG. 1 is a block diagram for a robot system that is used to perform work on a workpiece according to an embodiment described in the present disclosure.
Figure 2:
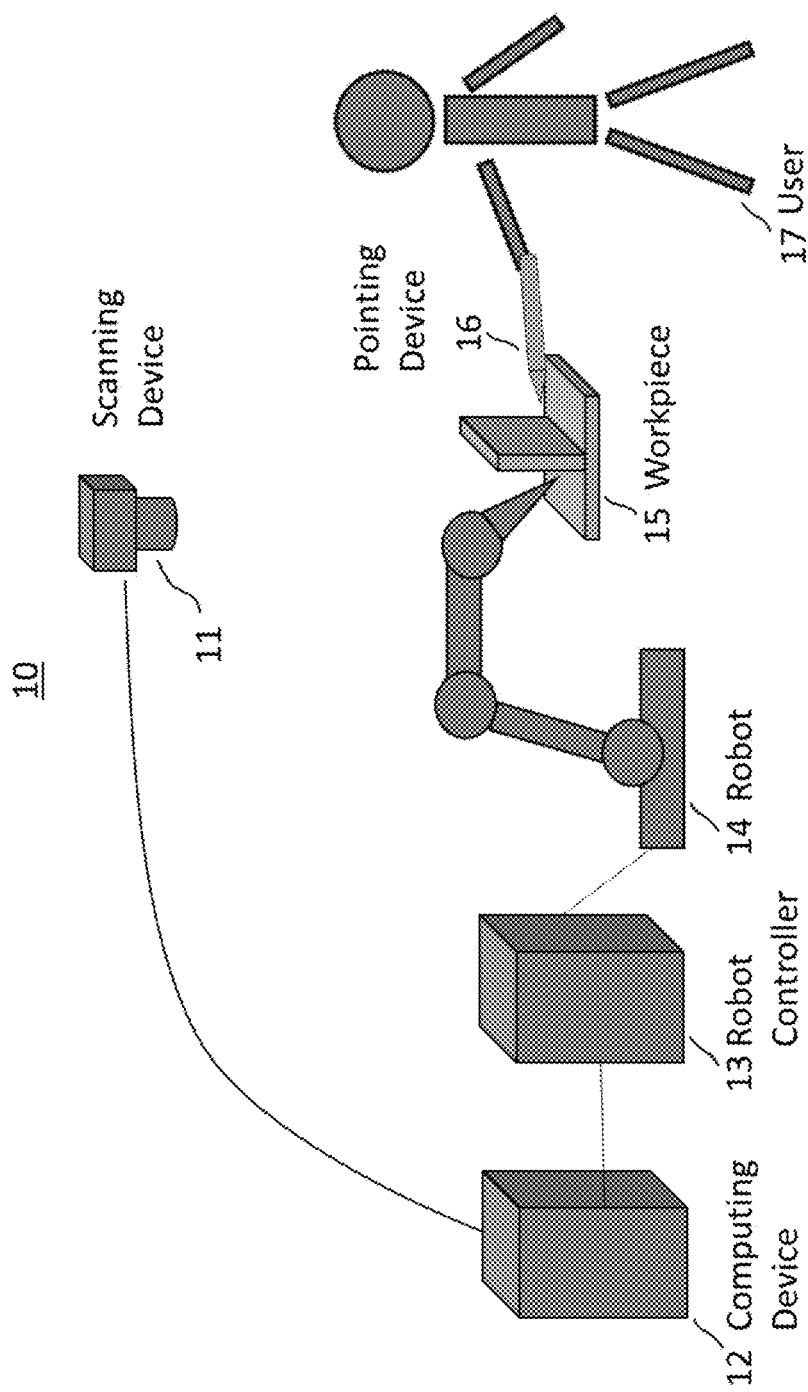
FIG. 2 is a graphical representation of the block diagram disclosed in FIG. 1.

Referring now to FIGS. 1 and 2, there is shown a block diagram of a robot teaching system 10 with an industrial robot 14 which is used to perform work on a workpiece 15. The robot 14 is a programmable machine with two or more degrees of freedom whose motions are determined by controller 13. The robot teaching system 10 includes scanning device 11 and a computation device 12. Computation device 12 and robot controller 13 may or may not share the same housing and/or processing components, such as CPU, GPU, RAM, long term storage and so on. The robot program used to operate the industrial robot is in robot controller 13. The process agnostic pointing device 16 is held and manipulated by the user 17 such that one or more poses of the pointing device 16 can be used by the computation device 12 to calculate one or more poses to be included in the robot program used to operate the industrial robot 14 to perform work on the workpiece 15. The terms "robot program" and "robot instructions" can be considered interchangeable in the description herein. A robot program is a collection of one or more robot instructions, and a set of one or more robot instructions can be executed as a robot program.

The scanning device 11 can perform 3D scans by using various techniques, such as binocular vision, photogrammetry, structured light or other 3D sensing technologies known to those who are skilled in the art. It can also be capable of collecting 2D RGB information and/or fusing 2D and 3D data into RGB-D representations, i.e. RGB plus depth representations as known to those skilled in the art.

Figure 3:
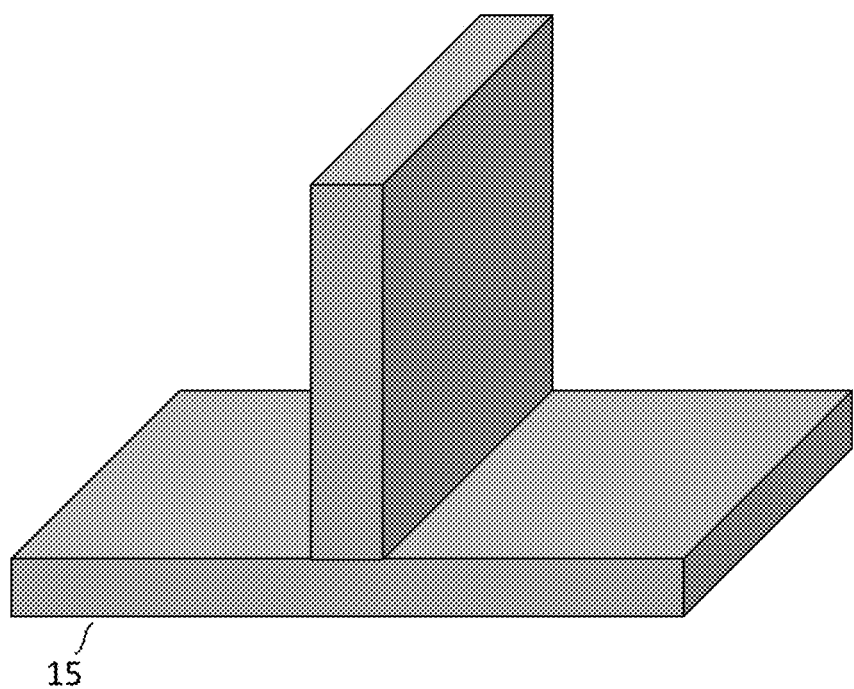
FIG. 3 shows a sample work piece on which the robot would perform work.

Referring now to FIG. 3, there is shown a simple workpiece 15 to be operated on by the industrial robot 14. The robot operation performed on the workpiece could be any type of operation, such as but not limited to welding, deburring, painting, pick and place, or inspection. It is important to note the workpiece 15 that is scanned by the scanning device 11 does not necessarily need to be the exact same object that the robot 14 will perform work on as long as the geometry of the scanned workpiece 15 is substantially the same as the workpiece that the robot will perform work on.

Figure 4:
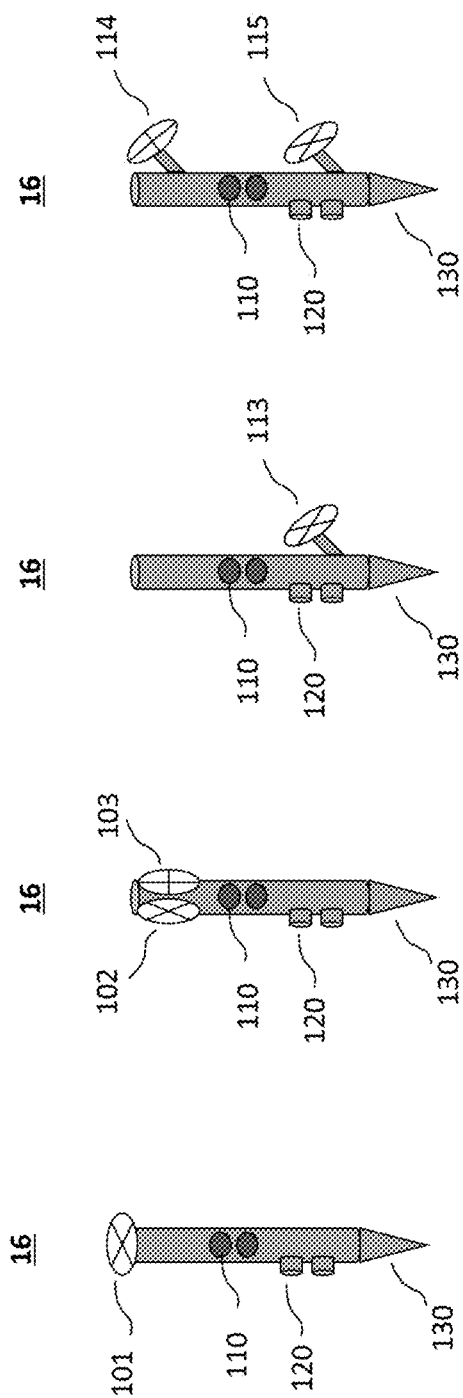
FIGS. 4A-4D show four embodiments of process agnostic pointing devices.

Referring now to FIGS. 4A and 4B, there are shown two representative embodiments of process agnostic pointing devices. The process agnostic pointing device can include feedback means to provide information to the user while the user moves the pointing device 16 to one or more poses for the purpose of programming the robot. One embodiment includes multiple colored LEDs 110 on the pointing device 16 to indicate status information such as, but not limited to, an LED that turns either green or red to indicate that the pointing device's 16 pose is being observed or not by the scanning device 11. Another embodiment can use one of the LEDs 110 to indicate that a pose was saved and is reachable by the robot 14. Another embodiment can use one of the LEDs 110 to flash when the wireless communication between the pointing device 16 and the computation device 12 has failed. These are only meant as representative embodiments, as there are many possible states and conditions that may arise during the teaching operation, and these can be communicated to the user via, without limitation, LEDs, haptic feedback (such as small vibrations), sound, or other feedback means. In additional embodiments, visual feedback can be provided through, without limitation, computer screens, such as a laptop, tablet computer or smart phone, and/or augmented reality.

During the teaching operation, the user can indicate that the pointing device's 12 current pose should be recorded and used to generate the robot program. The generated robot program is comprised of robot motion commands and/or other commands, such as setting IOs, or other typical industrial robot instructions known to those skilled in the art. The robot program could be either a complete stand-alone program or a series of commands that will be incorporated in a larger program at a later time. As one embodiment, the user can press one of the buttons 120 on the pointing device. Additional buttons, dials, scrollable wheels, or other input means can be used to input robot program parameters and/or robot program states, such as increasing the speed, turning a weld gun on or off, when to close a gripper, if the motion is a process motion or a non-process motion (e.g. a weld motion or simply moving in the air without welding), and so forth. These robot program values, such as robot parameters and/or robot program states, will be shown to the user on a graphical user interface. Other robot actions or robot parameters can be associated with these types of user inputs in keeping with the spirit of this invention. The buttons 120 in FIGS. 4A and 4B are meant to be representative of possible input means, but other options are possible in keeping with the spirit of the present invention.

FIG. 4A shows a fiducial marker 101 at end of the pointing device 16, opposite from where the device is pointing its tip 130. This fiducial marker 101 could be a unique 2D symbol seen by the scanning device 11 and that the computation device 12 recognizes to locate the end of the pointing device 16. Several image recognition algorithms are useable by someone skilled in the art to accurately detect and locate the 2D symbol and calculate the corresponding location of the tip 130. FIG. 4B shows an alternative embodiment where multiple fiducials 102 and 103 are observable to the scanning device 11.

FIG. 4C shows an alternative embodiment that has a fiducial marker 113 placed in relatively close proximity to the tip 130 of the pointing device 16. FIG. 4D shows an alternative embodiment with multiple fiducials 114 and 115 placed in relatively close proximity to each end of the pointing device 16. Other embodiments are possible as well, including and not limited to, a higher number of 2D fiducial markers, active emitters (such as LEDs), markers whose locations and/or orientations are adjustable, or one or more 3D shapes that can be used to track the end of the pointing device 16.

Figure 5:
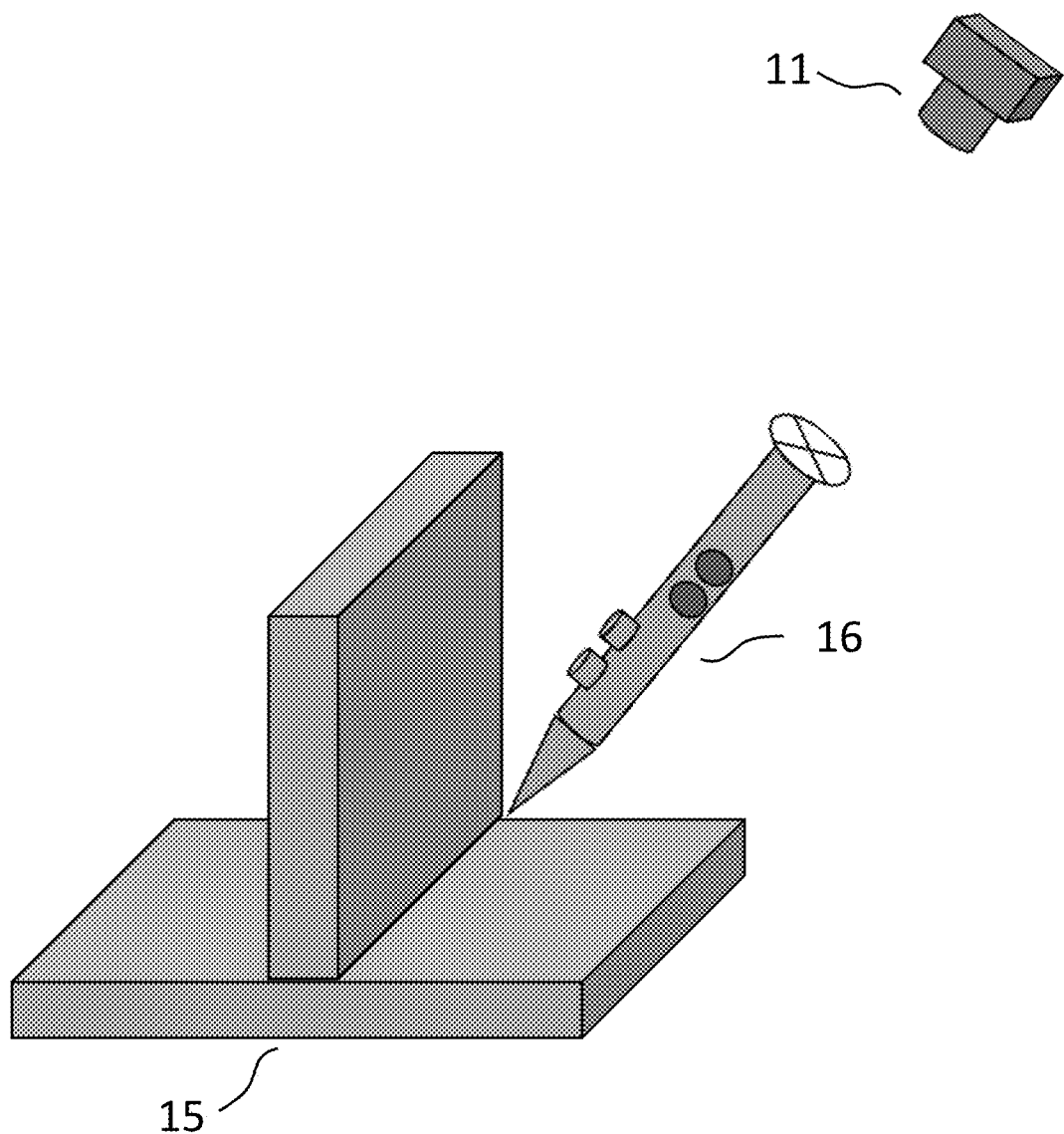
FIG. 5 shows an example of the process agnostic pointing device pointing to a location for the robot to perform work on a sample workpiece.

Referring now to FIG. 5, there is shown a simple work piece 15 to be operated on by the industrial robot 14, the process agnostic pointing device 16 positioned by the user 17 (not shown) such that the pointing device is indicating a pose to be used by the computation device 12 to generate the robot instructions for the robot 14 to operate on the workpiece 15. FIG. 5 also shows the scanning device 11 that observes the pointing device 16 so that the scanning device 11 can accurately communicate the pointing device's 16 pose to the computation device 12 in order that user-selected poses will be used to generate the robot instructions.

Figure 6:
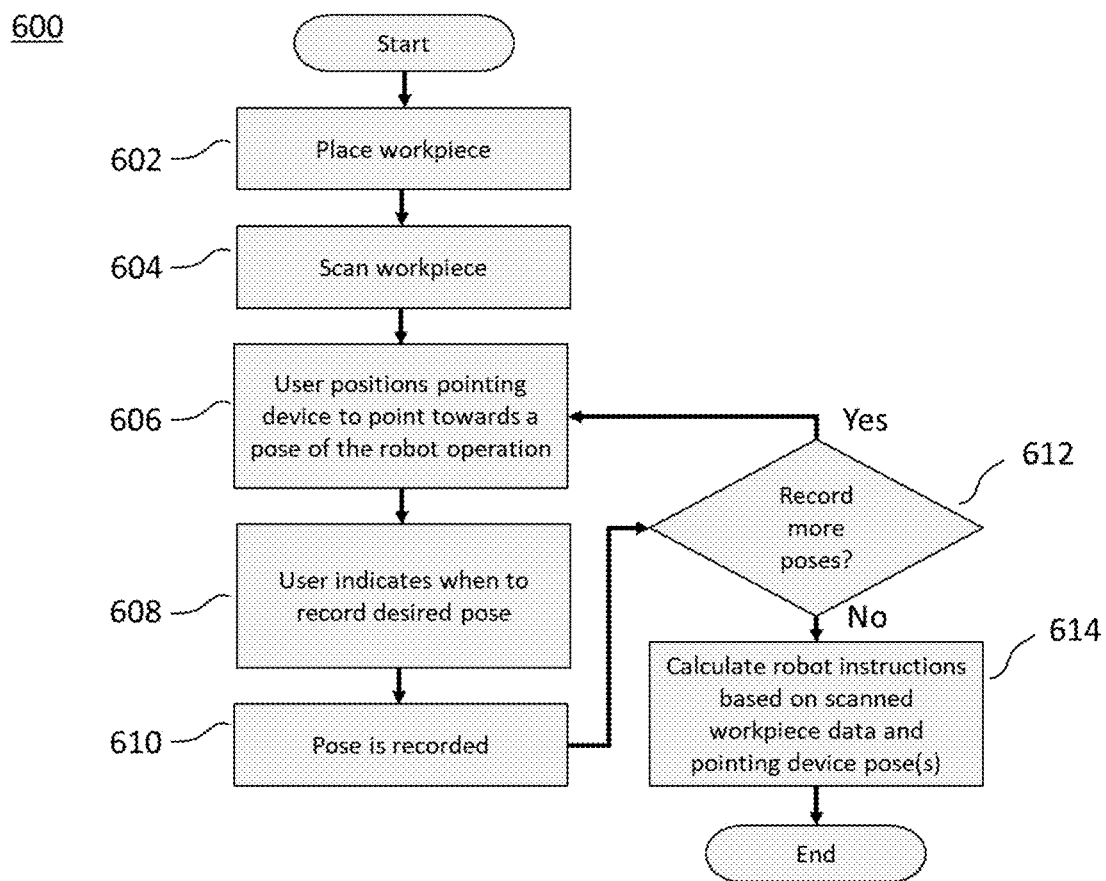
FIG. 6 is a flowchart illustrating one example of a method of scanning a workpiece and using the pointing device to record poses used for creating instructions for the robot to perform work on a workpiece.

Referring now to FIG. 6, there is shown a flowchart for a method 600 that uses the scanning device 11, computation device 12 and process agnostic pointing device to create instructions for the robot 14 to perform an operation on a workpiece 15.

At step 602, the workpiece 15 is placed in view of the scanning device 11. This may or may not include putting the workpiece 15 in a fixture, depending on the intended robotic process to be performed. It should be noted that the scanned workpiece 15 can be an object that either is the actual workpiece 15 on which the robot will perform the operation, or accurately represents the dimensions and shape of the actual workpiece.

At step 604, a 3D scan will be performed on the workpiece 15. The 3D scan will create a 3D representation of the object in the computation device 12. The 3D scan can be performed in a number of ways, as known to those who are skilled in the art. This includes using a 3D vision system which combines multiple views of the workpiece and thereby eliminating gaps caused by occlusions from one or more viewpoints. The multiple views can be achieved through several means, such as having more than one stationary vision systems, by moving a single vision system to multiple viewpoints, or by a combination of stationary and moving vision systems. The vision systems could use binocular vision, photogrammetry, structured light or other 3D sensing technologies known to those who are skilled in the art. The end result of the scan is that a 3D representation of the workpiece 15 is saved in the computation device 12. Optional post processing can be performed on the 3D representation, such as smoothing, plane fitting, hole filling and other steps that are known to those who are skilled in the art of 3D scanning.

As another alternative embodiment, a human user holds the scanning device 11 and scans the workpiece 15 by moving the scanning device to one or more positions from which the scanning device can capture 3D information through means known to those who are skilled in the art. In one such embodiment, the scanning device 11 is integrated with a tablet computer or smart phone. In another such embodiment, the scanning device 11 is removably attached to a tablet computer or smart phone. In another such embodiment, the scanning device 11 is a stand-alone device.

After scanning the workpiece the human user can mount the scanning device 11 to a fixed or movable device. In one such embodiment, the fixed device is a tripod. In another such embodiment, the movable device is a robot.

At step 606, after the 3D scan of the workpiece takes place, a process agnostic pointing device 16 will be held and positioned by the user 17 at one or more positions to indicate where the robot 14 is intended to perform its operation(s). The pose of the pointing device will be observed by a scanning device 11, and the computation device 12 will calculate the relationships between the pointing device pose, the 3D representation of the workpiece 15, and the robot coordinate system using calibration techniques known to those skilled in the art.

In one embodiment, the calibration means will be that fiducials will be placed on the workpiece 15 and/or its surrounding area. The robot 14 will move to a known offset from a known feature on the fiducials, such as but not limited to, touching a known point on the fiducials with a tool held by the robot 14. The computation device 12 will record the robot 14 poses while touching three or more points on three or more fiducials. These same points will be found in scanning device's 11 images. The calibration transformation between the robot 14 coordinate system and the scanning device coordinate system can be calculated from the aforementioned recorded robot 14 poses and the aforementioned points in the scanning device's 11 images using transformation calculation means known to those skilled in the art.

As an alternate embodiment, the scanning device 11 for scanning the workpiece 15 may be different from the scanning device 11 used to record the pose of the pointing device 16. For example, without limitation, a 3D point cloud generating device can be used as the scanning device 11 to collect the 3D information of the workpiece 15 while a high resolution 2D camera can be used to track one or more fiducials 101, 102 and/or 103 on pointing device 16 in 3D space using means well known to those skilled in the art. Other combinations or embodiments are possible while keeping with the spirit of the present invention.

Due to possible occlusions between a single scanning device 11 and the pointing device 16, multiple views of the pointing device 16 may be needed. Similar to what was described above for providing multiple views of the workpiece 15, multiple views of the pointing device can be achieved by using a 3D vision system which combines multiple views of the workpiece and thereby eliminating gaps caused by occlusions from one or more viewpoints. The multiple views can be achieved through several means, such as having more than one stationary scanning devices 11, by moving a single scanning device 11 to multiple viewpoints, or by a combination of stationary and moving scanning devices 11. In the case of a moving scanning device 11, the scanning device 11 can be mounted on a robot and the robot can then be used to move the scanning device 11 by following the pointing device 16, by the user jogging a robot, by the user selecting one of several predefined viewing locations, or any other robot moving means known to those skilled in the art. The robot motion used to move the robot mounted scanning device 11 can be achieved while the operator is collocated with the robot in the robot cell by using a safety monitored stop, speed and separation monitoring, power and force limits, or other safety means known to those skilled in the art. Alternatively, a moving scanning device 11 can be mounted on a track, pan-and-tilt system or similar device.

At step 608, after moving the pointing device 16 to the appropriate pose, the user will indicate that the pose of the pointing device 16 should be recorded by the computation device 12. This can be done via buttons 120 on the pointing device 16 or other standard input means. Later in the process, the computation device 12 will then use the recorded pose(s) of the user guided pointing device 16 to generate robot commands that perform operation(s) on the workpiece 15.

At step 610, the pose selected by the user in step 608 will be stored in the computation device 12.

At step 612, a decision will be made whether or not more poses will be recorded. In one embodiment, the default decision will be to continue collecting more poses until the user indicates that no more poses are needed by pressing one of the buttons 120 on the process agnostic pointing device 16 or an alternative input means known to those skilled in the art. To collect more poses, the process will return to step 606. If the user indicates no more poses are needed, then the process will continue to step 614.

At step 614, the computation device 12 will process both the 3D scan information collected in step 604 and all the recorded poses from the combination of steps 606 through 612.

In one embodiment, the computation device 12 will analyze the shapes created by scanning the workpiece 15 during step 604. For example, without limitation, the computation device would perform a best fit for predefined shapes, including, without limitation, planes, partial cylinders or partial spheres in the scanned representation of the workpiece 15 by using geometry fitting algorithms known by those skilled in the art. The computation device 12 will then create robot motion instructions based on locating the closest point to the pose taught from the pointing device 16 and the intersections of two or more of the best fit geometries. This approach will create high quality points on the workpiece 15 even if the user did not point accurately to the workpiece 15. In an alternative embodiment, the computation device 12 will create robot motion instructions based on the closest point to the pose taught from the pointing device 16 and the center of the closest geometric shape in the 3D scan information, such as, without limitation, a rectangle, circle, or triangle. In an alternative embodiment, the computation device 12 will create robot motion instructions based on locating the closest point to the pose taught from the pointing device 16 and the intersection of an edge of one of the best fit geometries.

The orientations contained in the robot motion instructions can also be calculated by the computation device 12 by, without limitation, using the best fit geometries. For example, the angle of intersection between two best fit geometries can be halved to determine one or more orientation angles for the robot motion instruction. In an alternate embodiment, the normal of a best fit geometry could be used.

In an alternate embodiment, the process rules and/or heuristics known by those skilled in the art for welding, painting, material removal, and so on can be combined with the best fit geometries and the recorded process agnostic pointing device 16 poses and sequences of poses. For example, without limitation, the computation device can use a previously specified robot tool angle for the welding process, combined with halving the intersection angle of two planes, to calculate a very accurate tool orientation used in the robot motion instructions. This, combined with calculating the closest projection of the recorded pointing device's 16 location on the intersection line of two best fit planes, would provide a highly accurate position and orientation for the robot motion instructions. Other rules and/or heuristics for other applications are possible in keeping with the spirit of the present invention.

In an alternate embodiment, the computation device 12 will create additional robot instructions based on knowledge of the process. For example, for a welding path, the computation device 12 will add additional points at the start and end of the welding path robot motion instructions with a predefined distance offset to enable the robot to safely approach and depart from the workpiece 15 before and after the welding motion instructions, respectively. In another example, for a machining path, the computation device 12 will add points at the start of the milling path robot motion instructions with a predefined distance offset to enable the robot to start the milling tool and then safely approach the workpiece to perform the milling work. Likewise, the computing device 12 will add points at the end of the milling path robot instructions with a predefined offset to enable the robot to depart from the workpiece 15 safely and stop the milling tool. As can be readily appreciated, many more process-based rules can be used to generate additional robot motion and non-motion instructions automatically in keeping with the spirit of this invention.

In an alternate embodiment, the computation device 12 will set choose robot instructions and parameters of robot instructions based on knowledge of the process. For example, for a welding path, the computation device 12 will choose a weld command and a weld speed based on the type of weld, type of metal and thickness of material. In another example, for a machining path, the computation device 12 will choose a tool speed based on what tool is being used and the type of material being removed.

In an additional embodiment, traceability data will be stored in a database before, during or after the user records desired poses. Examples of traceability data include, without limitation, user name, date, part type, part ID, recorded poses, and/or associated scan information. Traceability data will be retrieved for quality checks as needed.

Figure 7C:
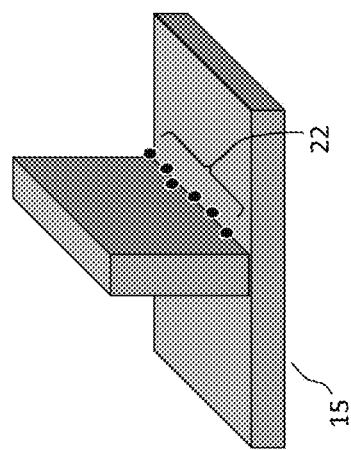
FIGS. 7A-7C show a sequence of teaching steps taken while using the robot teaching system described in the present disclosure.
Figure 7B:
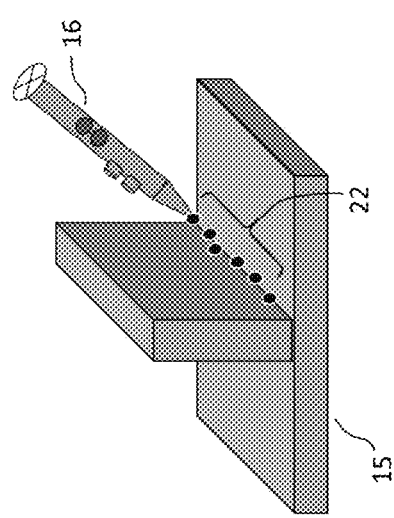
Figure 7A:
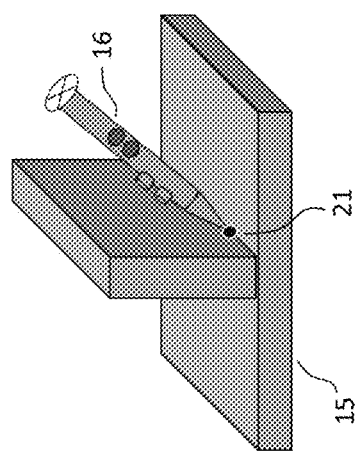

Referring now to FIGS. 7A-7C, FIG. 7A shows the process agnostic pointing device 16 being held by the user (not shown) so that it is pointing to a pose in relation to the workpiece 15. As described above, the user will indicate that the computation device 12 should record the current pose of the tip 130 of the pointing device 16 via pressing a button 120 on the pointing device 16 or by similar means. As outlined in the above description, the user can repeat the process so that any number of poses 21 can be recorded as a series of poses 22, as shown in FIG. 7B. FIG. 7C shows an example series of poses 22 in relationship to the workpiece 15 after an example series of teaching steps is performed.

Referring now to FIGS. 8A-8F, FIG. 8A shows an example series of poses 22 in relationship to the workpiece 15 after an example series of teaching steps is performed as described above. FIG. 8B is a representation of an example 3D point cloud stored in computation device 12 after the 3D scan of the workpiece 15. For illustrative purposes, the point cloud of only two surfaces 31 and 32 are represented in FIGS. 8B-8E. As can be appreciated by those skilled in the art, a complete 3D point cloud or other 3D scanning output representation could include additional portions of the workpiece 15.

Referring now to FIG. 8C, planes 33 and 34 are generated by the computation device 12 based on best fit plane calculation techniques known to those skilled in the art by using the 3D point cloud data stored in the computation device, including the point clouds of two surfaces 31 and 32. Line 35 is derived from the intersection of planes 33 and 34. FIG. 8D shows the recorded poses 22 from earlier steps superimposed in the 3D representation of the point clouds 31 and 32, the generated planes 33 and 34, and the line 35 intersecting planes 33 and 34. The relationship between the recorded poses 22 and the 3D point clouds 31 and 32 is derived through mapping techniques known to those skilled in the art.

Referring now to FIG. 8E, the series of poses 23 represents the result of computation device 12 calculating the closest projection of each pose in the series of recorded poses 22 such that each pose will lie on the intersection line 35. FIG. 8F shows these projected poses 24 in relationship to the workpiece 15. This series of steps described through the explanation of FIGS. 8A-8F describes one embodiment of how the computation device will combine the 3D scan data, one or more poses 22 collected by the user's manipulation of the process agnostic pointing device 16, and process heuristics (e.g. perform a weld at the intersection of two planes). As described above, other rules and/or heuristics can be used to generate the poses for robot instructions to be generated by the robot teaching system 10.

It should be appreciated that some workpieces 15 will have multiple options for intersecting planes and other shapes. In an alternative embodiment, a tablet computer, laptop, augmented reality, or similar device will be used to allow the user to select which planes and/or shapes to use as a basis for projecting poses 22 into the proper relationship with the scanned information of workpiece 15.

It should be appreciated that the same algorithms described above to calculate the closest projected poses 23 of each of the recorded poses 22 to an intersection line 35 can be calculated in real time prior to the recording, i.e. immediately, as the user moves pointing device 16. These projections can be shown to the user on various displays, including, but not limited to, a tablet computer, a laptop, computer screen, or augmented reality. The user can adjust the pose of the pointing device 16 based on the observation of the projected pose in order to get the desired projected pose. In cases where there are multiple possible intersection lines, such as but not limited to three planes being close together, multiple potential projections can be shown to the user in real time on a graphical user interface. In such cases, the user would use the buttons 120 on the pointing device to select which of the possible projections they want to record. In an alternative embodiment, the user would use the buttons 120 on the pointing device to select to not use a projection for the pose they are recording, and just use the actual pointing device 16 pose as it is. In an alternative embodiment, the orientation of the pointing device 16 would be used to select which of the possible projections, such as but not limited to, selecting the projected point that is closest to the majority of the body of the pointing device 16. In an alternative embodiment, the projected point would be selected using rules, such as but not limited to, selecting the projection that is colinear to previously selected projected points for the most recent series of poses being taught. For example, without limitation, the previous two points would be used as a reference to determine what is colinear.

It should be appreciated that in addition to showing each of the projected poses 23 in real time, that the robot path motions and robot poses and configurations for the projected poses 23 can also be shown in real time. For example, the robot path motions can be shown in real time as lines connecting the various projected poses 23 that show the intended path of the robot tool. Additionally, the robot pose and configuration at one of the projected poses 23 can be shown in real time by showing a representation of the robot or part of the robot at that said one of the projected poses 23.

Figure 9:
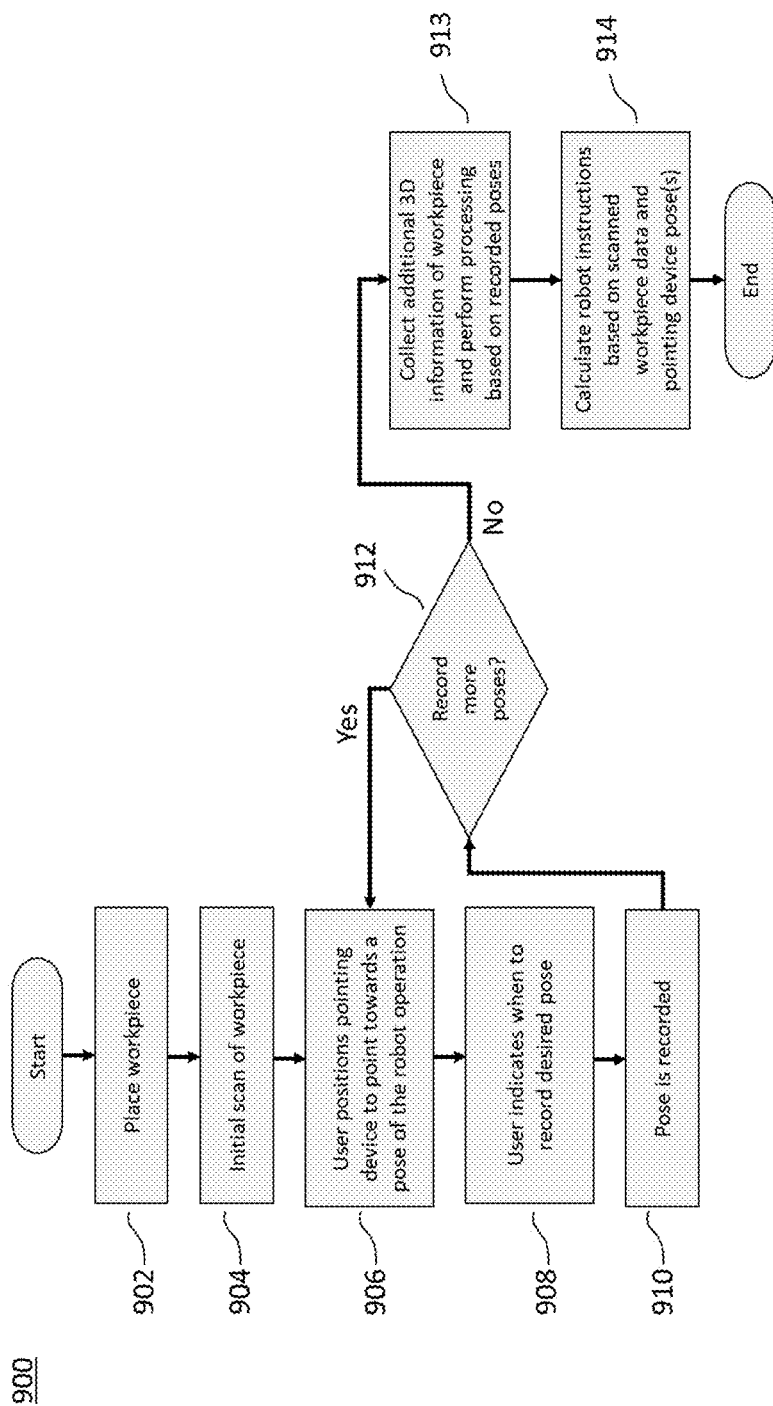
FIG. 9 shows an alternative embodiment with a flowchart illustrating a method of scanning a workpiece, then using the pointing device to record poses used for creating instructions for the robot to perform work on a workpiece, and then performing an additional scan before creating the robot instructions to perform work on a workpiece.

Referring now to FIG. 9, there is shown a flowchart for a method 900 that uses the scanning device 11, computation device 12 and process agnostic pointing device to create instructions for the robot 14 to perform an operation on a workpiece 15. This flow is an alternative embodiment to what is described above for FIG. 6.

At step 902, the equivalent step is performed as described above for step 602.

At step 904, the equivalent step is performed as described above for step 604.

At step 906, the equivalent step is performed as described above for step 606.

At step 908, the equivalent step is performed as described above for step 608.

At step 910, the equivalent step is performed as described above for step 610.

At step 912, a decision will be made whether or not more poses will be recorded. In one embodiment, the default decision will be to continue collecting more poses until the user indicates that no more poses are needed by pressing one of the buttons 120 on the process agnostic pointing device 16. To collect more poses, the process will return to step 906. If the user indicates no more poses are needed, then the process will continue to step 913.

At step 913, an additional 3D scan will be performed on the workpiece 15. The 3D scan will create a more accurate 3D representation of all of or portions of the workpiece 15 in the computation device 12 by performing a more accurate 3D scan at locations near the poses recorded by the user using the process agnostic pointing device 16 in steps 906, 908, 910 and 912. The more accurate 3D scan can be performed in a number of ways, as known to those who are skilled in the art, as described above for step 604. In one embodiment, the more accurate scan will be performed by using a 2D laser line scanner to scan the regions within a predefined range around the poses recorded in steps 906, 908, 910 and 912. In this embodiment, the scan would result in a one or more point clouds that can be registered with the initial point cloud generated in step 904 using registration means known to those skilled in the art. The points generated by the second, more accurate scan, can then be used to replace the less accurate points generated earlier in step 904. Thus, the highly accurate points generated in the scan in step 913 would be saved for the regions of interest of the program as defined by the poses recorded in steps 906, 908, 910 and 912. As can be appreciated by those skilled in the art, alternative scanning and replacing means are also possible in keeping with the spirit of this invention. Alternate embodiments of 3D scanning would include, without limitation, collecting one or more pieces of 3D information about the workpiece 15 by using a single point laser distance sensor, or using a contact sensing means, such as by using electric or force based measurement, when a portion of a robot tool comes in contact with the workpiece 15.

At step 914, the equivalent step is performed as described above for step 614 except that the 3D information about the workpiece 15 will be based on the output of step 913, which is a merge of data from steps 904 and the scan performed in step 913 as described above.

Figure 10:
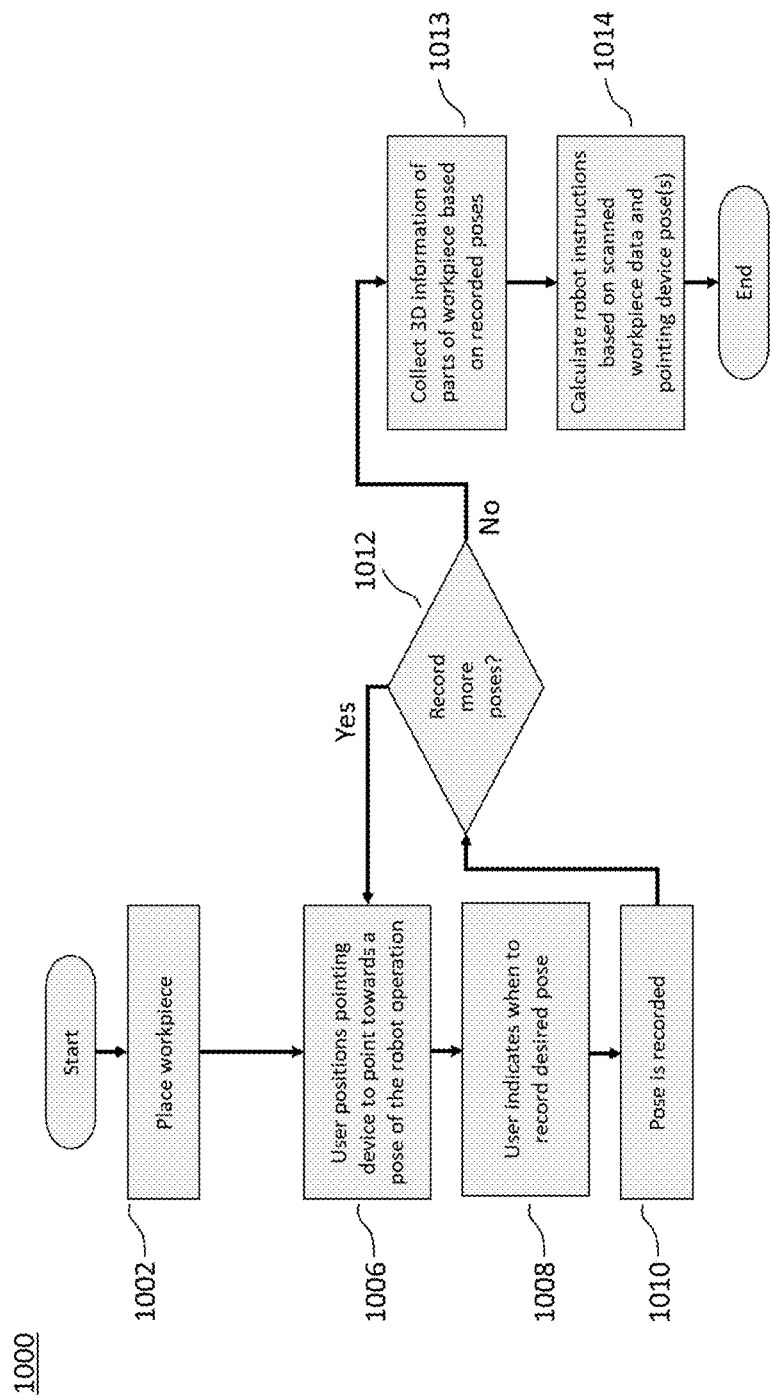
FIG. 10 shows an alternative embodiment with a flowchart illustrating a method of using the pointing device to record poses used for creating instructions for the robot to perform work on a workpiece, and then performing a scan of the workpiece before creating the robot instructions to perform work on a workpiece.

Referring now to FIG. 10, there is shown a flowchart for a method 1000 that uses the scanning device 11, computation device 12 and process agnostic pointing device to create instructions for the robot 14 to perform an operation on a workpiece 15. This flow is an alternative embodiment to what is described above for FIG. 6. Unlike the flowchart in FIG. 6, the alternative embodiment in FIG. 10 does not perform a scan of the workpiece 15 until after the user records desired poses.

At step 1002, the equivalent step is performed as described above for step 602.

At step 1006, the equivalent step is performed as described above for step 606 with the exception that there is no preceding scan of the workpiece 15 and the relationship of the workpiece 15 and the other coordinate systems is not defined at this point.

At step 1008, the equivalent step is performed as described above for step 608.

At step 1010, the equivalent step is performed as described above for step 610.

At step 1012, a decision will be made whether or not more poses will be recorded. In one embodiment, the default decision will be to continue collecting more poses until the user indicates that no more poses are needed by pressing one of the buttons 120 on the process agnostic pointing device 16. To collect more poses, the process will return to step 1006. If the user indicates no more poses are needed, then the process will continue to step 1013.

At step 1013, a 3D scan will be performed on the workpiece 15. The 3D scan will create a partial 3D representation of the object in the computation device 12 by performing a 3D scan at locations near the poses recorded by the user using the process agnostic pointing device 16 during steps 1006, 1008, 1010, and 1012. The 3D scan can be performed in a number of ways, as known to those who are skilled in the art, as described above for step 604. The computation device 12 will calculate the relationships between the recorded pointing device poses, the 3D representation of the scanned workpiece 15, and the robot coordinate system using calibration techniques known to those skilled in the art.

At step 1014, the equivalent step is performed as described above for step 614 except that the 3D information about the workpiece will be based on scan performed during step 1013.

Figure 11B:
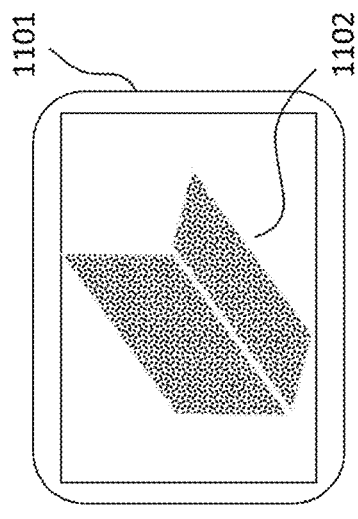
FIGS. 11A-11D show an alternative embodiment using a tablet computer, scanned workpiece data, and user input to record poses used for creating instructions for the robot to perform work on a workpiece.

Referring now to FIGS. 11A-11D, FIG. 11A shows workpiece 15. FIG. 11B shows a 3D representation 1102 of part of workpiece 15 on a tablet computer 1101 after it has been scanned by the scanning device 11. The 3D representation can be point cloud or other 3D representation known to those skilled in the art. As can be appreciated by those skilled in the art, a complete 3D point cloud or other 3D scanning output representation could include additional portions of the workpiece 15.

In one embodiment, the computation device 12 will analyze the 3D scan from the scanning device 11. The computation device would perform a best fit for predefined shapes, including, without limitation, planes, partial cylinders or partial spheres in the scanned representation of the workpiece 15 by using geometry fitting algorithms known by those skilled in the art. The results of the geometry fitting algorithms would be used as the 3D representation 1102 of the workpiece 15 on a tablet computer 1101.

In one embodiment, the tablet computer 1101 includes a touch screen and the user will input locations 1111 on the screen by touching locations with their finger 1112. As can be appreciated by those skilled in the art, alternative input means such as, without limitation, using a stylus on a touch screen or a mouse on a laptop.

Figure 11D:
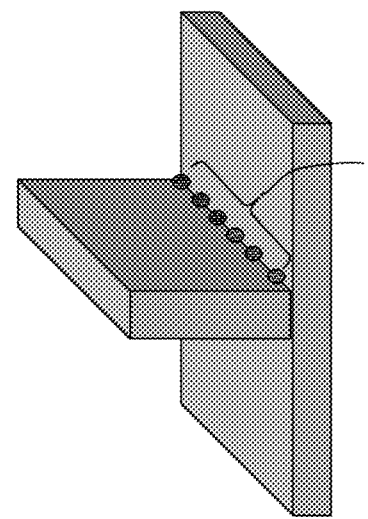
Figure 11A:
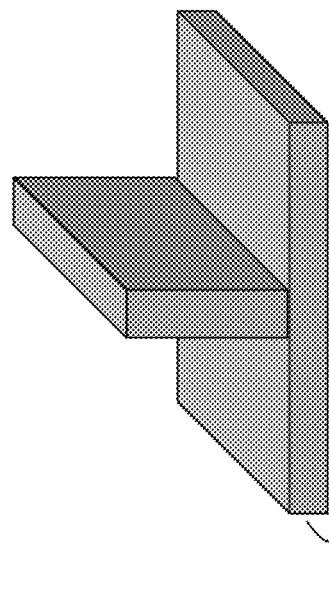
Figure 11C:
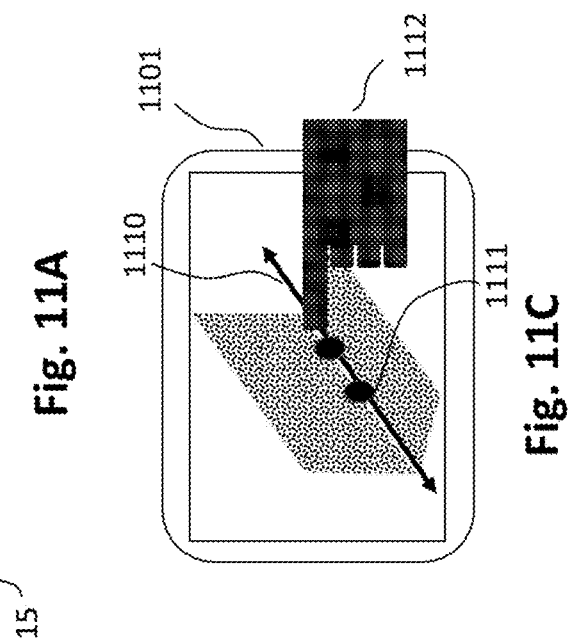

In one embodiment, the input locations 1111 are moved by the computational device 12 to touch the closest point on an intersecting line 1110 that is the intersection of two closest planes of the 3D representations 1102 of workpiece 15. The calculation of intersecting lines and the closest point on the intersecting lines can be performed by algorithms known by those skilled in the art. After the user selects all the points required for the operation on the workpiece, the computational device will use the locations of the closest points and process rules and/or heuristics known by those skilled in the art for welding, painting, material removal, and so on to generate robot instructions to perform work on the workpiece 15. For example, without limitation, the locations of the closest points will be combined with halving the intersection angle of two planes to generate the position and orientation of robot motion commands. FIG. 11D shows an example of a series of poses 124 generated by the computational device 12 after performing the aforementioned steps.

As can be appreciated by those skilled in the art, the computational device 12 can be a single physical device or can be a distributed system. A single physical device could be, without limitation, a tablet computer, PC, edge computer or server on the cloud. A distributed system could perform some calculations across multiple physical devices such as, without limitation, a tablet computer, PC(s), edge computer (s) or server(s) on the cloud.

In an alternative embodiment, after poses are taught using the process agnostic teaching device 16 as described elsewhere in this document, a 3D scan will be performed just before work is performed on the workpiece 15. The 3D scan will include part or all of the workpiece 15. The 3D scan can be performed by the same scanning device 11 that was used during the method to create robot instructions to perform work on workpiece 15, or a difference scanning device. The 3D information collected during this pre-work 3D scan will be registered to the 3D point information collected in the method to create robot instructions to perform work on workpiece 15. The registration method would be based on iterative closest point algorithms, or other methods known by those skilled in the art. The registration transformation generated by the registration method would be used to adjust the poses in the robot instructions in order to be accurately calibrated before the robot performs work on workpiece 15.

In an additional embodiment, a 3D scan of the workpiece 15 will be performed after the work is performed on the workpiece, producing a post work 3D scan. The said post work 3D scan would be compared with the 3D scan of an ideal workpiece that had work performed on it earlier. The two 3D scans will be registered using 3D registration means known to those skilled in the state of the art. After registering the two 3D scans, the 3D scans will be compared by calculating all the distances of points in the 3D scan from the workpiece 15 that just had work performed on it and the 3D scan of the ideal workpiece. The sum of the distances will be calculated and compared to a threshold value to determine if the differences are sufficiently small to ensure a good quality of the work performed on the workpiece 15 that just had work performed on it. In an alternative embodiment, the comparison is limited to portions of the workpiece 15, for example, regions within a predefined distance from locations where work is performed on workpiece 15. In a further embodiment, the distances can be shown to the user on a graphical user interface. This can be done by various means such as, without limitation, color coding the point cloud based on the distance values. One color coding scheme would be making the points with the largest distances red and gradually transitioning the color all the way to green as the points have the smallest distances. As can be easily appreciated, other color coding schemes could be used, as well as other graphical means, to show the distance values, such as histograms, bar graphs, or other means.

In another alternative embodiment, the threshold for determining if the sum of the distances between 3D scans is a good or bad quality is learned using machine learning techniques known by those skilled in the art. For example, without limitation, 3D scans are made after every workpiece 15 is produced. The sum of the distances between each 3D scan and the scan of an ideal workpiece are recorded and a quality indicator is also recorded with each sum of the distances. The sum of the distances can be stored as a single value, or as values based on regions of the 3D scans. Support vector machines, or other machine learning techniques, can be trained using this data to predict the quality of future workpieces based on the differences between their 3D scans and the 3D scan of the ideal workpiece.

In an additional embodiment, a visual scan (i.e. color scan) and 3D scan of the workpiece 15 will be performed after the work is performed on the workpiece, producing a post work RGB-D scan, i.e. color and depth scan. The said post work RGB-D scan would be compared with an RGB-D scan of an ideal workpiece that had work performed on it earlier. The two RGB-D scans will be registered using 3D registration means known to those skilled in the state of the art. After registering the two RGB-D scans, the 3D portion of the scans will be compared by calculating all the distances of points in the 3D scan from the workpiece 15 that just had work performed on it and the 3D scan of the ideal workpiece. The RGB (i.e. color) values for the closest points between the two scans will be compared to a threshold value to determine if the differences in color and/or intensity are sufficiently small to ensure a good quality of the work performed on the workpiece 15 that just had work performed on it. In an alternative embodiment, the RGB comparison is limited to portions of the workpiece 15, for example, regions within a predefined distance from locations where work is performed on workpiece 15. In a further embodiment, the regions with significant color differences as determined by a predefined or user defined threshold can be shown to the user on a graphical user interface by means of using a special color, such as red or white, or other visually recognizable attribute. In an alternative embodiment, the user interface can highlight areas that have both a significant RGB difference as well as 3D distance, as defined by respective predefined or user defined thresholds. The highlighting can be done by various means such as, without limitation, color coding the point cloud based on the distance values and adding a predefined color, such as red or white, for regions where the color of the two RGB-D scans is significantly different as defined by the color difference threshold. As can be appreciated, there are several additional variations of comparing and displaying RGB-D differences in keeping with the spirit of this invention.

Figure 12:
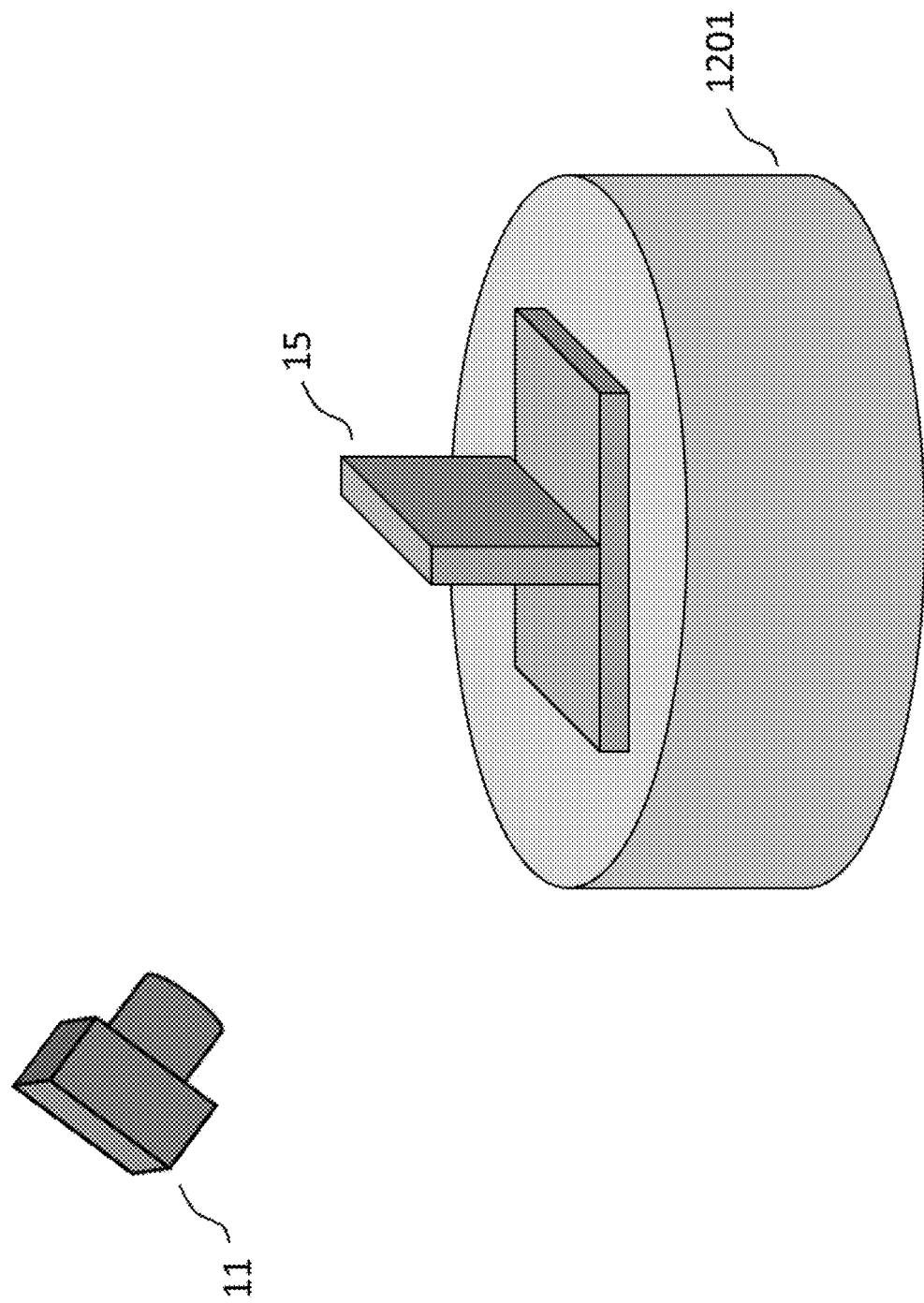
FIG. 12 shows an alternative embodiment using an external axis to scan a workpiece.

Referring now to FIG. 12, there is shown an alternative embodiment to generate a 3D scan of workpiece 15 where workpiece 15 is placed on an external axis 1201 where the workpiece 15 is observable by the scanning device 11. In one embodiment, the external axis 1201 is a turn table that rotates the workpiece 15 such that the scanning device 11 can observe more than one view of workpiece 15. The computation device 12 will register 3D scan information from the more than one view of the workpiece 15 in order to build a single 3D representation of workpiece 15. In an alternative embodiment, the external axis 1201 is a linear axis which moves the workpiece 15 to more than one position in order for the scanning device 11 to observe more than one view of workpiece 15 so the computing device 12 can build a single 3D representation of workpiece 15 from the more than one views. In an alternative embodiment, the scanning device 11 is on the external axis and the motion of the external axis 1201 in, for example but without limitation, a linear or circular motion, will provide multiple views of workpiece 15 so the computing device 12 can build a single 3D representation of workpiece 15 from the more than one views. In an alternative embodiment, the external axis 1201 is replaced with a passive device, such as a rotating table, that a human operator repositions manually in order to generate multiple views of the workpiece 15.

Figure 13A:
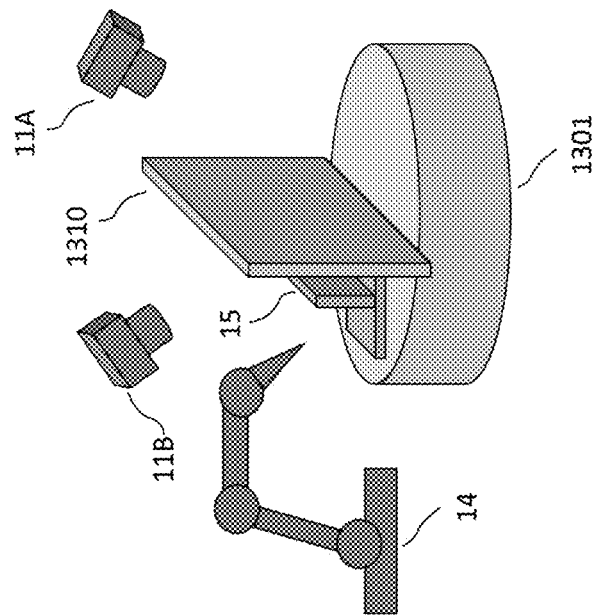
FIGS. 13A-13B show an alternative embodiment with a workpiece on an external axis that rotates the workpiece into and out of a robot's workspace.
Figure 13B:
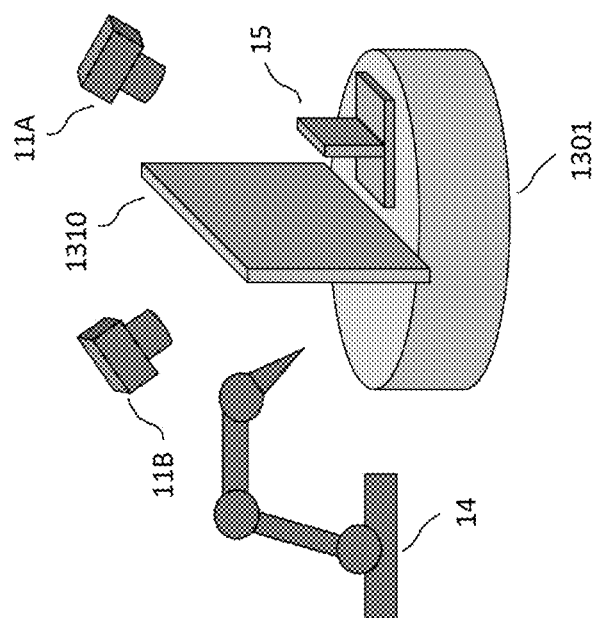

Referring now to FIGS. 13A-13B, there is shown an alternative embodiment where workpiece 15 is placed on an external axis 1301. In FIG. 13A the flow of work is as described in FIG. 9. The initial scan of workpiece 15 is performed while workpiece 15 is not in the workspace of the robot 14, and one scanning device 11A is able to observe and perform a 3D scan of workpiece 15. A user will teach poses using a process agnostic pointing device 16 while the workpiece 15 is still outside of the workspace of robot 14, and there is an optional barrier 1310 between the workspace of robot 14 and where the user teaches the poses as shown in FIG. 13A. In this alternative embodiment, after the user teaches all the poses used as inputs into the creating of a robot program, the external axis moves the workpiece 15 into the workspace of the robot 14. After the workpiece is in the workspace of the robot, the additional 3D information is collected by the scanning device 11B according to the flow of work described in FIG. 9. The calibration of the 3D data in these two scanning steps will be performed using common calibration means known to those skilled in the art. As can be appreciated, the scanning devices 11A and/or 11B can include more than one sensor with different viewing perspectives and/or can be on movable devices, such as but not limited to an additional axis or a robot. In an alternative embodiment, the external axis 1301 is replaced with a passive device, such as a rotating table, that a human operator repositions manually in order to generate multiple views of the workpiece 15 and/or move the workpiece 15 within reach of the robot 14.

In an alternative embodiment, additional 3D information is not collected by the scanning device 11B after the external axis has moved the workpiece 15 into the workspace of the robot 14. In this alternative embodiment, the relationship between the workpiece 15 and the fiducials in the workspace is known before and after the workpiece is moved into the workspace of the robot 14. In this embodiment, the scanning device 11B detects the fiducials and, since the relationship between the fiducials and the workpiece 15 are known, the location of the workpiece 15 can be calculated using transformation and calibration means known to those skilled in the state of the art.

Figure 14A:
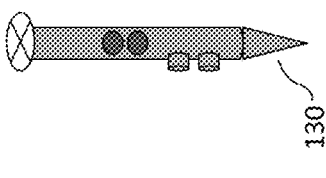
FIGS. 14A-14E show alternative embodiments of a process agnostic pointing device with modular and exchangeable tips.
Figure 14B:
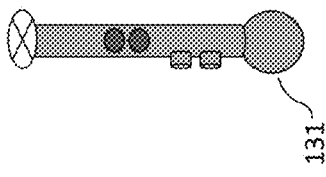
Figure 14C:
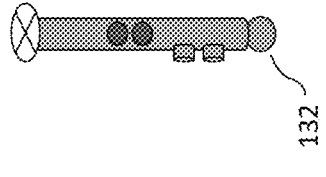
Figure 14D:
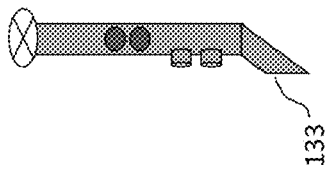
Figure 14E:
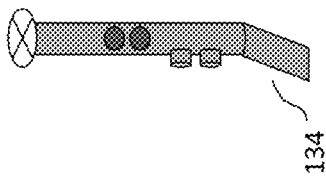

Referring now to FIGS. 14A-14E, there is shown alternative embodiments of a process agnostic pointing device 16 with modular and exchangeable tips. In FIG. 14A the tip 130 of the process agnostic pointing device 16 is removably attached with an attachment means such as, without limitation, one or more screws. Different process agnostic tips will have various geometric features such as, without limitation, points, spheres of different sizes, and flat surfaces of different orientations relative to the axial direction of the process agnostic pointing device 16. Examples of these various shapes, without limitation, are shown in FIGS. 14A-14E, including a point 130 in FIG. 14A, a large sphere 131 in FIG. 14B, a small sphere 132 in FIG. 14C, a prism with a vertical face 133 in FIG. 14D, and a prism with a horizontal face 134 in FIG. 14E. Each of these said tips are removable and replaceable with another tip whenever the other tip enables more convenient or accurate pointing of the device to the desired poses to be taught. For example, a tip with a prism with a horizontal face will enable the user to easily maintain a desired orientation. As another example, a tip with a different shape can enable the user to easily reach into corners of a workpiece 15.

FIGS. 15A-15D show alternative embodiments of a process agnostic pointing device with modular and exchangeable trackable elements. In FIG. 15A the trackable element 105 of the process agnostic pointing device 16 is removably attached with an attachment means such as, without limitation, one or more screws. Different trackable elements will have various features that enable their poses to be tracked by the scanning device 11. The different trackable elements will vary in appearance and/or shape such as, without limitation, having 2D fiducials and/or unique shapes that are uniquely identifiable. Examples of these various removably attached trackable elements, without limitation, are shown in FIGS. 15A-15D, including a single 2D fiducial 105 in FIG. 15A, two 2D fiducials arranged in a known relationship to each other 106 in FIG. 15B, three 2D fiducials arranged in a known relationship to each other 107 in FIG. 15C, and a unique 3D shape with zero or more fiducials 108 in FIG. 15D. Each of these said trackable elements are removable and replaceable with another trackable element whenever the other trackable element enables better tracking based on lighting conditions, distance to scanning device 11, or other tracking configuration considerations known to those skilled in the art.

As can be appreciated by those skilled in the art of robot programming, a benefit of the present invention is the generation of highly accurate robot motions because they are generated by the computation device 12 directly from the actual workpiece 15 dimensions. Additionally, robot motion commands are derived from poses collected from a highly accurate pointing device 16 that are further refined by projecting those poses on the shapes of the real workpiece 15.

As can be further appreciated by those skilled in the art of robot programming, one benefit of using the highly accurate, process agnostic pointing device 16 is that the same device can be used for programming a wide variety of processes. For example, even though a robotic cell may have dozens of tools for deburring, milling, cutting, and drilling, a user can teach all the deburring, milling, cutting, and drilling operations with the same process agnostic pointing device 16. They can also teach painting, dispensing, pick and place, and other processes with the same process agnostic pointing device 16. Other applications and options are possible in keeping with the spirit of the present invention.

One benefit of this approach is that it reduces the training burden of the end user who may need to teach more than one process type and may need to work with more than one robot tool when they create more than one robot program, such as, without limitation, milling tools, drills, and saws. Another benefit of this approach is that there is only one pointing device 16. Cost and time are thereby kept low in creating and calibrating the pointing device. Another benefit is that the pointing device is very consistent and accurate, no matter which user teaches the program. The pose of the pointing device 16 can be tracked consistently, reducing risks of introducing variations and inaccuracies in the teaching process. The reduction of these enables the high accuracy to be maintained, as described above.

A further benefit of this approach is that the accuracy and teaching flexibility is maintained in a robot programming system that does not require detailed understanding of robot programming. The robot teaching system 10, provides a way for the user to specify robot motion poses by using a simple pointing device 16 and without the user knowing how to write robot motion commands themselves.

It is important to note that the robot 14 described in this invention could be, but not limited to, any mechanical device with more than one degree of freedom whose motions can be programmed via software. This includes, but is not limited to, 6 degree of freedom serial industrial robot arms, CNC machines, and 4 degree of freedom parallel structure robot. The operations performed by the robot could be, but not limited to welding, deburring, milling, painting, inspecting, and pick and place.

It is also important to note that there are a wide variety of possible communication means between the pointing device 16 to the computation device 12, such as IR, Bluetooth, or other means known by those skilled in the state of the art.

The invention claimed is:

1. A robot teaching system, comprising:
    a first 3D scanning device, a second 3D scanning device, and a third 3D scanning device;
    a process-agnostic pointing device;
    a computation device; and
    a storage device in communication with the computation device, the storage device storing instructions that when executed by the computation device results in a method comprising:
        causing the first 3D scanning device to capture a first 3D scan of a workpiece;
        causing the second 3D scanning device to track a first pose of the pointing device proximal to the workpiece, wherein the first pose is in response to a first user input and indicates a first spatial point;
        causing the third 3D scanning device to capture a second 3D scan of a region of the workpiece to which the pointing device had been proximal, wherein the second 3D scan has a higher resolution or higher accuracy than the first 3D scan;
        determining at least one best-fit geometry of the second 3D scan;
        projecting the first spatial point to a first geometric point having a predefined relationship to an individual one of the best-fit geometries; and
        defining a robot instruction based on the first geometric point.

2. The method of claim 1, wherein the third scanning device comprises a contact sensing device.

3. The system of claim 1, wherein the at least one best-fit geometry comprises a plane.

4. The system of claim 1, wherein the at least one best-fit geometry comprises a line formed at an intersection of two planes.

5. The system of claim 1, wherein the at least one best-fit geometry comprises an edge of a surface.

6. The system of claim 1, wherein the method further comprises:
    presenting the at least one best-fit geometry to a user via a graphical user interface contemporaneous with the first user input.

7. The system of claim 6, wherein the method further comprises:
    selecting the individual one of the best-fit geometries according to a second user input via the graphical user interface.

8. The system of claim 7, wherein the graphical user interface comprises an augmented reality interface.

9. The system of claim 8, wherein the method further comprises:
    selecting the individual one of the best-fit geometries according to one or more selection rules.

10. The system of claim 1, wherein the first scanning device and the second scanning device are the same device.

11. A robot teaching system, comprising:
    a first 3D scanning device and a second 3D scanning device;
    a process-agnostic pointing device;
    a computation device; and
    a storage device in communication with the computation device, the storage device storing instructions that when executed by the computation device results in a method comprising:
        causing the second 3D scanning device to track a first pose of the pointing device proximal to a workpiece, wherein the first pose is in response to a first user input and indicates a first spatial point;
        causing the first 3D scanning device to capture a first 3D scan of a region of the workpiece to which the pointing device had been proximal;
        determining at least one best-fit geometry of the first 3D scan;
        projecting the first spatial point to a first geometric point having a predefined relationship to an individual one of the best-fit geometries; and
        defining a robot instruction based on the first geometric point.

12. The system of claim 11, wherein the at least one best-fit geometry comprises a plane.

13. The system of claim 11, wherein the at least one best-fit geometry comprises a line formed at an intersection of two planes.

14. The system of claim 11, wherein the at least one best-fit geometry comprises an edge of a surface.

15. The system of claim 11, wherein the method further comprises:
    presenting the at least one best-fit geometry to a user via a graphical user interface contemporaneous with the first user input.

16. The system of claim 15, wherein the method further comprises:
    selecting the individual one of the best-fit geometries according to a second user input via the graphical user interface.

17. The system of claim 16, wherein the graphical user interface comprises an augmented reality interface.

18. The system of claim 11, wherein the method further comprises:
    selecting the individual one of the best-fit geometries according to one or more selection rules.

19. The system of claim 11, wherein the first scanning device and the second scanning device are the same device.

* * * * *